(12) United States Patent
Kief et al.

(10) Patent No.: US 7,310,202 B2
(45) Date of Patent: Dec. 18, 2007

(54) MAGNETIC RECORDING HEAD WITH CLAD COIL

(75) Inventors: Mark T. Kief, Lakeville, MN (US);
Nurul Amin, Woodbury, MN (US);
Song S. Xue, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 419 days.

(21) Appl. No.: 10/809,245

(22) Filed: Mar. 25, 2004

(65) Prior Publication Data

US 2005/0213246 A1     Sep. 29, 2005

(51) Int. Cl.
G11B 5/17          (2006.01)
(52) U.S. Cl. ...................................... 360/123
(58) Field of Classification Search ................ 360/123
See application file for complete search history.

(56) References Cited

U.S. PATENT DOCUMENTS

| | | | |
|---|---|---|---|
| 4,760,481 A | 7/1988 | Yuito et al. | |
| 5,659,499 A | 8/1997 | Chen et al. | |
| 6,151,194 A | 11/2000 | Steinbrecher | |
| 6,351,409 B1 | 2/2002 | Rizzo et al. | |
| 6,430,084 B1 | 8/2002 | Rizzo et al. | |
| 6,430,085 B1 | 8/2002 | Rizzo | |
| 6,477,007 B1 | 11/2002 | Shukh et al. | |
| 6,515,826 B1 * | 2/2003 | Hsiao et al. ................. | 360/126 |
| 6,525,957 B1 | 2/2003 | Goronkin et al. | |
| 6,560,864 B1 | 5/2003 | Chang et al. | |
| 6,807,094 B2 * | 10/2004 | Saito et al. ................. | 365/173 |
| 6,894,870 B2 * | 5/2005 | Takahashi et al. .......... | 360/123 |
| 7,054,105 B2 * | 5/2006 | Mochizuki et al. ......... | 360/125 |
| 7,060,207 B2 * | 6/2006 | Sasaki et al. ............... | 360/126 |
| 2004/0080866 A1 * | 4/2004 | Hsiao et al. ................ | 360/123 |

FOREIGN PATENT DOCUMENTS

JP         2005-276421 A   * 10/2005

* cited by examiner

Primary Examiner—Jefferson Evans
(74) Attorney, Agent, or Firm—Kinney & Lange, P.A.

(57) ABSTRACT

A magnetic write head for recording data having reduced erasure caused by a magnetic field is disclosed. The magnetic write head include a main pole and a conductive coil positioned adjacent the main pole. The conductive coil is insulated from the main pole. The magnetic write head includes means for directing a magnetic field produced by the conductive coil toward the main pole.

35 Claims, 4 Drawing Sheets

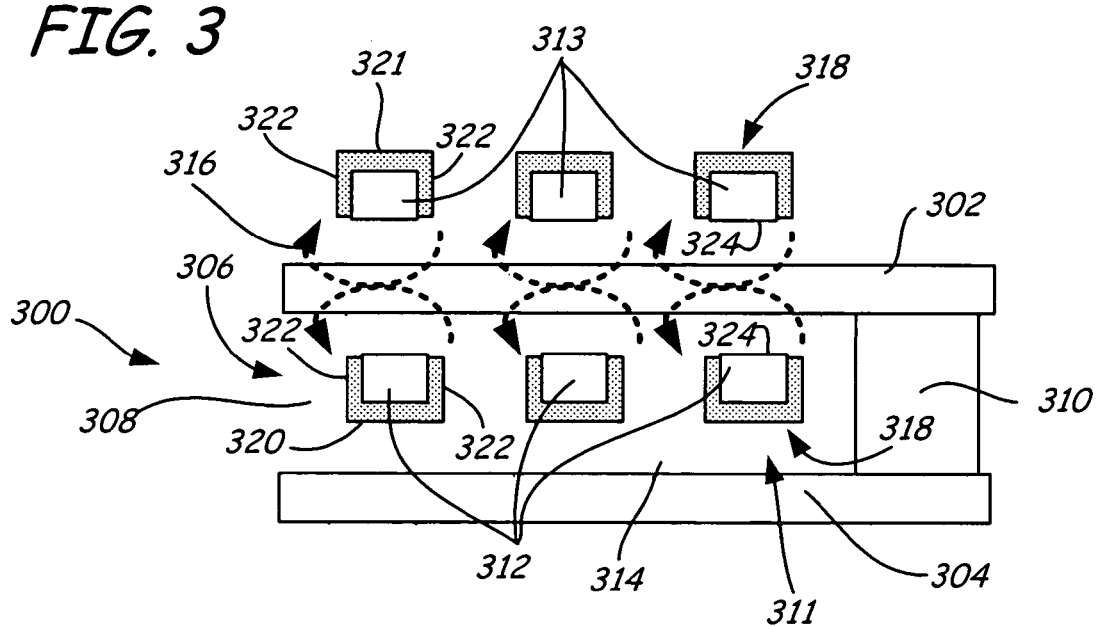
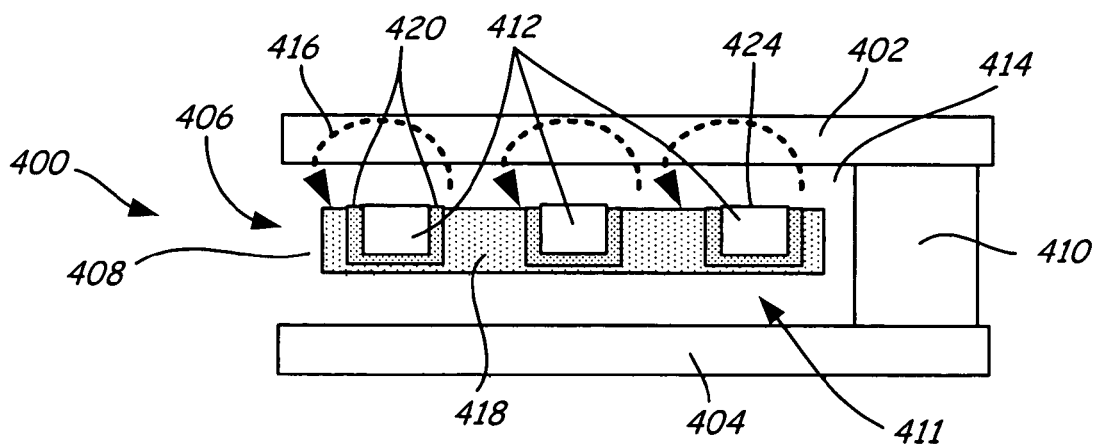

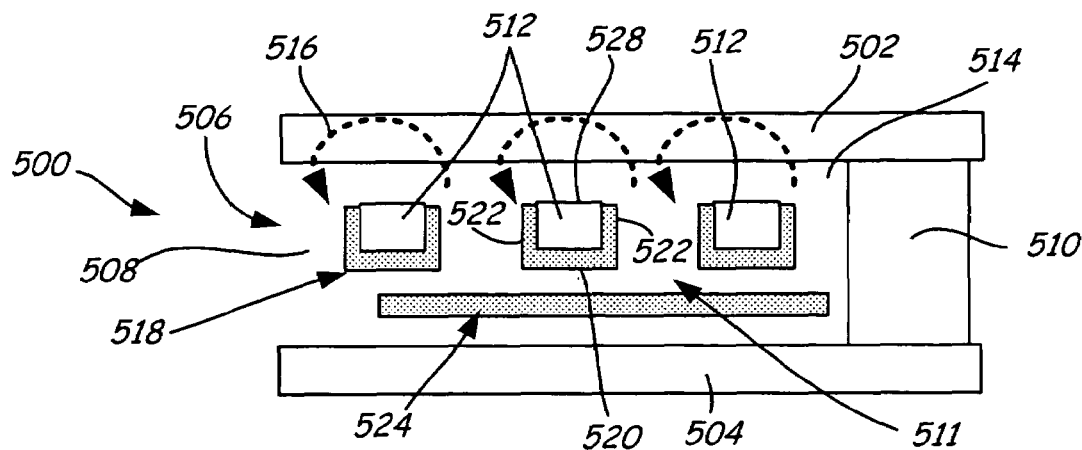
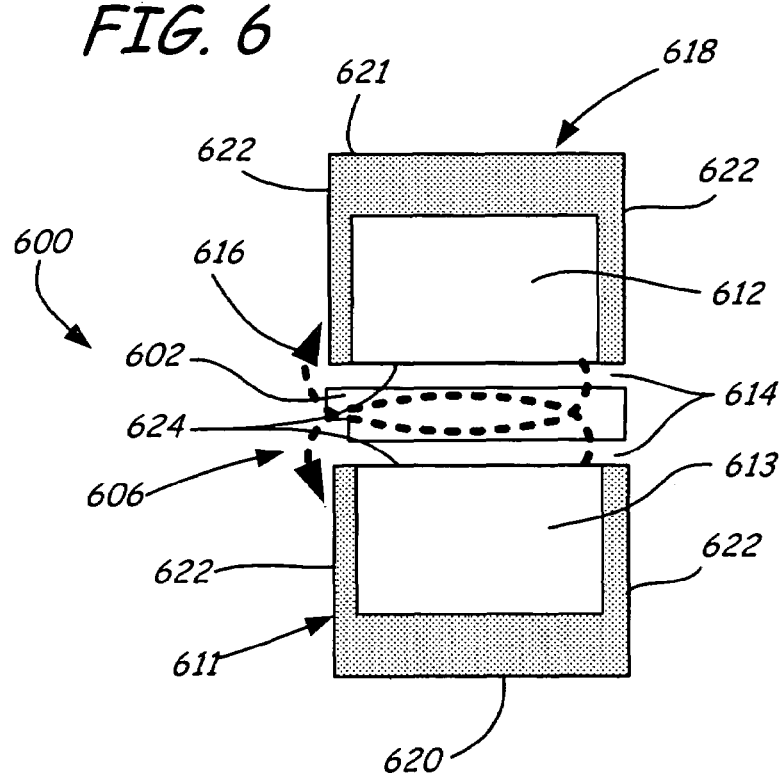

MAGNETIC RECORDING HEAD WITH CLAD COIL

CROSS-REFERENCE TO RELATED APPLICATION(S)

None.

BACKGROUND OF THE INVENTION

The present invention relates generally to the field of magnetic data storage and retrieval systems. In particular, the present invention relates to a magnetic write head having cladding on coils.

In a magnetic data storage and retrieval system, a transducing head typically includes a writer for storing magnetically-encoded information of a magnetic media and a reader for retrieving the magnetically-encoded information from the magnetic media. The reader typically consists of a bottom shield, a top shield, and a magnetoresistive sensor positioned between the bottom and top shields.

The writer typically consists of a main pole and a return pole, which are separated from each other at an air bearing surface (ABS) of the writer by a gap layer, and which are connected to each other at a region distal from the air bearing surface by a back gap closer or back via. Positioned at least partially between the main and return poles are one or more layers of conductive coils, which are encapsulated by insulating layers or a writer core. The writer and the reader may be arranged in a merged configuration in which a shared pole serves as both the top shield in the reader and the return pole in the writer.

To write data to the magnetic media, an electrical current is caused to flow through the conductive coils to induce a magnetic field across the write gap between the main and return pole. By reversing the direction of the current through the coil, the polarity of the data written to the magnetic media is reversed. Because the main pole is generally the trailing pole of the main and return poles, the main pole is used to physically write the data to the magnetic media. Accordingly, it is the main pole that defines the track width of the written data. More specifically, the track width is defined by the width of the main pole at the ABS.

The current passing through the coils causes a magnetic field to generate entirely around the coils and extend from the main pole to the return pole. The magnetic field at the main pole is concentrated at the tip of the main pole and allows the main pole to write. It is important that the magnetic field is effectively delivered at the pole tip with a minimum amount of current. In particular for perpendicular writing, it is important that the magnetic field at the return pole not be strong enough to partially or completely erase information recorded on the recording medium. Thus, there is a need in the art for directing the magnetic field generated by the coils to suppress the potential for side writing and erasing caused by the magnetic field.

BRIEF SUMMARY OF THE INVENTION

The present invention is a magnetic write head for recording data having reduced erasure caused by a magnetic field. The magnetic write head includes a main pole and a conductive coil positioned adjacent the main pole. The conductive coil is insulated from the main pole. The write head includes means for directing a magnetic field produced by the conductive coil toward the main pole.

BRIEF DESCRIPTION OF THE DRAWINGS

FIG. 3 is a cross-sectional view of a magnetic writer with clad coils in a helical design.

FIG. 4 is a cross-sectional view of a magnetic writer with clad coils in a flat design.

FIG. 5 is a cross-sectional view of a magnetic writer with clad coils in a flat design and a clad shield.

FIG. 6 is a cross-sectional view of a magnetic writer with clad coils.

DETAILED DESCRIPTION

Figure 1:
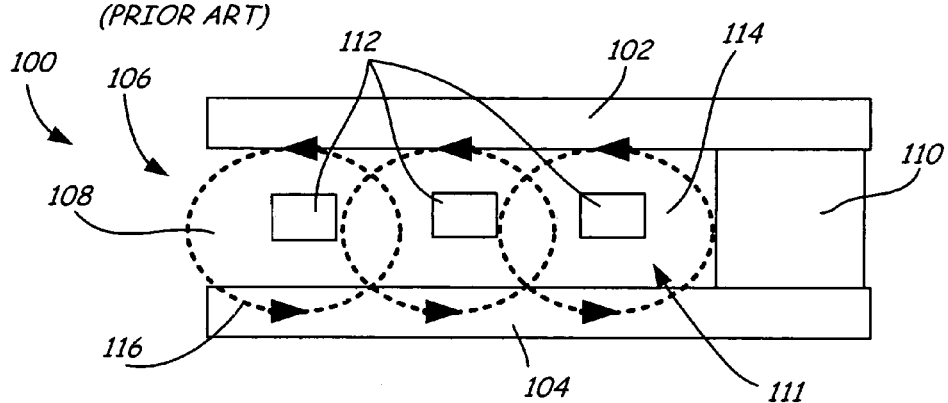
FIG. 1 is a cross-sectional view of a prior art magnetic writer.

FIG. 1 is a cross-sectional view of a prior art magnetic writer 100. The magnetic writer 100 has a main pole 102 and a return pole 104 that are connected to one another at a back closure or via 110. At an end opposite the via 110, the main pole 102 and return pole 104 are separated from one another by a gap 108 at an air bearing surface 106. Located between the main pole 102 and the return pole 104 is a conductive coil 111 having conductive coil turns 112 separated from the main pole 102 and return pole 104 by insulation 114. FIG. 1 shows conductive coil 111 arranged in a flat or pancake arrangement that spirals around the via 110. Therefore, there is an equal number of coil turns at an end opposite the via (not shown).

When current passes through conductive coil turns 112, a magnetic field 116 is generated. This magnetic field 116 becomes concentrated in the main pole 102 and causes the magnetic writer 100 to write to a disc. As shown in FIG. 1 the magnetic field extends out the end of the main pole 102 and returns to the return pole 104. If the magnetic field 116 at the return pole 104 is too strong, then erasure of the data can result because the magnetic field 116 at the return pole 104 is in a direction opposite to the direction of the magnetic field 116 at the main pole 102. The present invention provides a means for directing the magnetic field 116 generated by the conductive coil turns 112. In one embodiment the present invention provides a means for minimizing the magnetic field 116 at the return pole 104.

Figure 2:
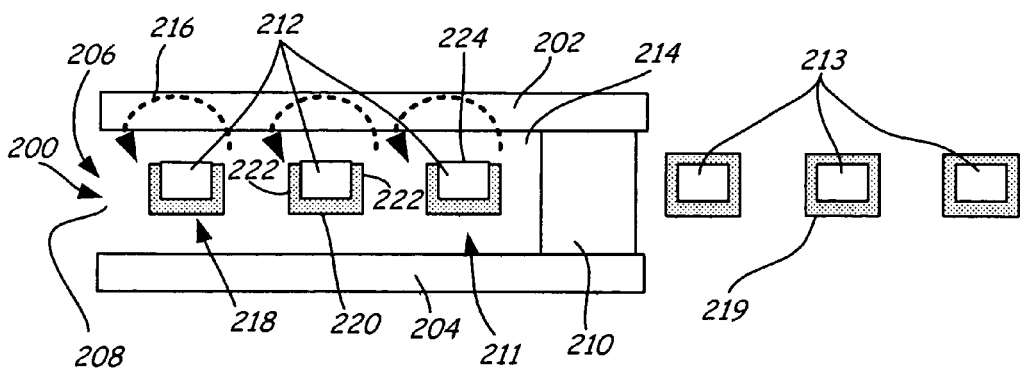
FIG. 2 is a cross-sectional view of a magnetic writer with clad coils in a flat design.

FIG. 2 is a cross-sectional view of a magnetic writer 200 having clad coils in a flat or pancake design with the other half of the coils not shown. The magnetic writer 200 has a main pole 202 and a return pole 204 that are connected to one another at a back closure or via 210. At an opposite end from the via 210, the main pole 202 and return pole 204 are separated from one another by a gap 208 at an air bearing surface 206. FIG. 2 shows the conductive coil 211 arranged in a flat or pancake arrangement that spirals around the via 210. Located between the main pole 202 and the return pole 204 is a conductive coil 211 having conductive first coil turns 212 separated from the main pole 202 and return pole 204 by insulation 214. First conductive coil turns 212 are shown removed from the air bearing surface 206. Located at an end opposite the via 210 are second coil turns 213.

First conductive coil turns 212 are surrounded by a cladding 218 constructed from a magnetic material. In this embodiment, the cladding 218 is in direct contact with the first conductive coils turns 212. Bottom cladding 220 and side cladding 222 cover three sides of the first conductive coil turns 212 leaving an open end 224 to face the main pole 202. The cladding 218 can cover only the portion of the first conductive coil turns 212 located between the main pole 202 and return pole 204 or can also cover the second coil turns 213. In the embodiment shown in FIG. 2, second conductive coil turns are covered on all four sides with cladding 219.

Because the cladding 218 has a much higher permeability than the surrounding material, the magnetic field generated around the conductive coil turns 212, 213 passes preferentially through the cladding 218, 219. Only where the cladding is not present is the magnetic field allowed to emanate from the conductive coil turn. Open end 224 of first conductive coil turn 212 is not covered with cladding, so the magnetic field 216 emanates outward from open end 224 of the first conductive coil turns 212 towards the main pole 202. Most of the magnetic field 216 is returned to the cladding 218 and not the return pole 204 because the cladding is magnetic. The cladding 218 decreases the strength of the magnetic field 216 at the return pole 204, so the potential for erasure is reduced. Second conductive coil turn 213 is completely covered with cladding, although in different embodiments the turn could be covered on less than all sides of the turn. Completely covering the turn 213 with cladding 219 further controls the magnetic field 216 by not having a gap for the magnetic field to emanate out from. The magnetic field 216 is contained withing the cladding 219.

FIG. 3 is a cross-sectional view of a magnetic writer 300 with clad coils in a helical design. The magnetic writer 300 has a main pole 302 and a return pole 304 that are connected to one another at a back closure or via 310. At an end opposite the via 310, the main pole 302 and return pole 304 are separated from one another by a gap 308 at an air bearing surface 306. Surrounding the main pole 302 in a helical design is a conductive coil 311 having a lower conductive coil turn 312 and an upper conductive coil turn 313. The lower conductive coil turns 312 are located between the main pole 302 and the return pole 304 and the upper conductive coil turns 313 are located above the main pole 302. The coil turns are shown as removed from the air bearing surface 306. Lower conductive coil turns 312 and upper conductive coil turns 313 are insulated from the poles by insulation 314.

Conductive coil turns 312, 313 are surrounded by a cladding 318 constructed of a magnetic material, and in this embodiment the cladding 318 is in direct contact with the conductive coil turns 312, 313. Bottom cladding 320 and side cladding 322 cover three sides of the lower conductive coil turns 312 leaving an open end 324 of the lower conductive coil turns 312 facing the main pole 302. Top cladding 321 and side cladding 322 cover three sides of the upper conductive coil turns 313, leaving an open end 324 of the upper conductive coil turn 313 facing the main pole 302. Because the cladding 318 has a much higher permeability than the surrounding material, the magnetic field 316 generated around the upper conductive coil turns 313 and lower conductive coil turns 312 passes preferentially through the cladding 318. Only where the cladding 318 is not present is the magnetic field 316 allowed to emanate from the conductive coil turns 312, 313. Open end 324 of conductive coil turns 312, 313 is not covered with the cladding 318, so the magnetic field 316 emanates outward from open end 324 of the conductive coil turns 312, 313 towards main pole 302. Because the cladding 318 is a magnetic material, most of the magnetic field 316 is returned to the cladding 318 and not the return pole 304. This decreases the strength of the magnetic field 316 at the return pole 304, so the potential for erasure is reduced.

FIG. 4 is a cross-sectional view of a magnetic writer 400 with clad coils in a flat or pancake design. The magnetic writer 400 has a main pole 402 and a return pole 404 that are connected to one another at a back closure or via 410 and separated from one another by a gap 408 at an air bearing surface 406. Located between the main pole 402 and the return pole 404 is a conductive coil 411 having conductive coil turns 412 separated from the main pole 402 and return pole 404 by insulation 414. The conductive coil 411 is arranged in a flat or pancake arrangement circling around the via 410.

Conductive coil turns 412 are surrounded by a cladding core 418. The coil turns 412 and cladding core 418 are shown as removed from the air bearing surface 406 but could be adjacent to the air bearing surface 406. In this embodiment, the cladding is insulated from the conductive coil turns 412 by an insulation layer 420. The insulation layer 420 covers three sides of the conductive coil turns 412 leaving open end 424 exposed to the main pole 402. A solid cladding core 418 that is a continuous piece of magnetic material encloses the conductive coil turns 412 leaving open end 424 exposed to the main pole 402. Because the cladding core 418 has a much higher permeability than the surrounding material, the magnetic field 416 generated around the conductive coil turns 412 passes preferentially through the cladding core 418. Only where the cladding core 418 is not present is the magnetic field 416 allowed to emanate from the conductive coil turns 412. Open end 424 of conductive coil turns 412 is not covered with the cladding core 418, so the magnetic field 416 emanates outward from open end 424 of the conductive coil turns 412 towards the main pole 402. Because the cladding core 418 is magnetic, most of the magnetic field 416 is returned to the cladding core 418 and not the return pole 404. Minimizing the magnetic field 416 at the return pole 404, decreases the strength of the magnetic field 316 at the return pole, so the potential for erasure is reduced. A cladding core 418 can also be provided around the coil turns located at an opposite end of the via 410 (not shown).

FIG. 5 is a cross-sectional view of a magnetic writer 500 with clad coils in a flat or pancake design and a clad shield 524. The magnetic writer 500 has a main pole 502 and a return pole 504 that are connected to one another at a back closure or via 510 and separated from one another by a gap 508 at an air bearing surface 506. Located between the main pole 502 and the return pole 504 is a conductive coil 511 having conductive coil turns 512 separated from the main pole 502 and return pole 504 by insulation 514. The conductive coil 511 is arranged in a flat or pancake pattern circling around the via 510. Therefore, there are an equal number of coil turns 512 at an end opposite the via 510 (not shown).

Conductive coil turns 512 are surrounded by a cladding 518 constructed of a magnetic material. In this embodiment, the cladding 518 is in direct contact with the conductive coil turns 512. Bottom cladding 520 and side cladding 522 cover three sides of the conductive coil turns 512 leaving an open end 528 of the conductive coil turns 512 exposed to the main pole 502. Because the cladding 518 has a much higher permeability than the surrounding material, the magnetic field 516 generated around the conductive coil turns 512 passes preferentially through the cladding 518. Only where the cladding 518 is not present is the magnetic field 516 allowed to emanate from the conductive coil turns 512. Open end 528 of the conductive coil turns 512 is not covered with cladding 518, so the magnetic field 516 emanates outward from open end 528 of the conductive coil turns 512 towards the main pole 502. Because the cladding 518 is magnetic, most of the magnetic field 516 is returned to the cladding 518 and not the return pole 504. In addition to the cladding 518 surrounding the conductive coil turns 512, a cladding shield 524 is used to further allow the magnetic field 516 to pass through the cladding shield 524 and minimize the magnetic field 518 at the return pole 504. The cladding shield 524 is also constructed of a magnetic material and may be necessary if the cladding 518 becomes saturated from the magnetic field 516. Directing the magnetic field 516 through the cladding 518 and cladding shield 524 minimizes the magnetic field 516 at the return pole, reducing the potential for erasure. The cladding 518 and the cladding shield 524 can be provided for the conductive coil turns 512 at an opposite end from the via 510 (not shown).

Figure 7:
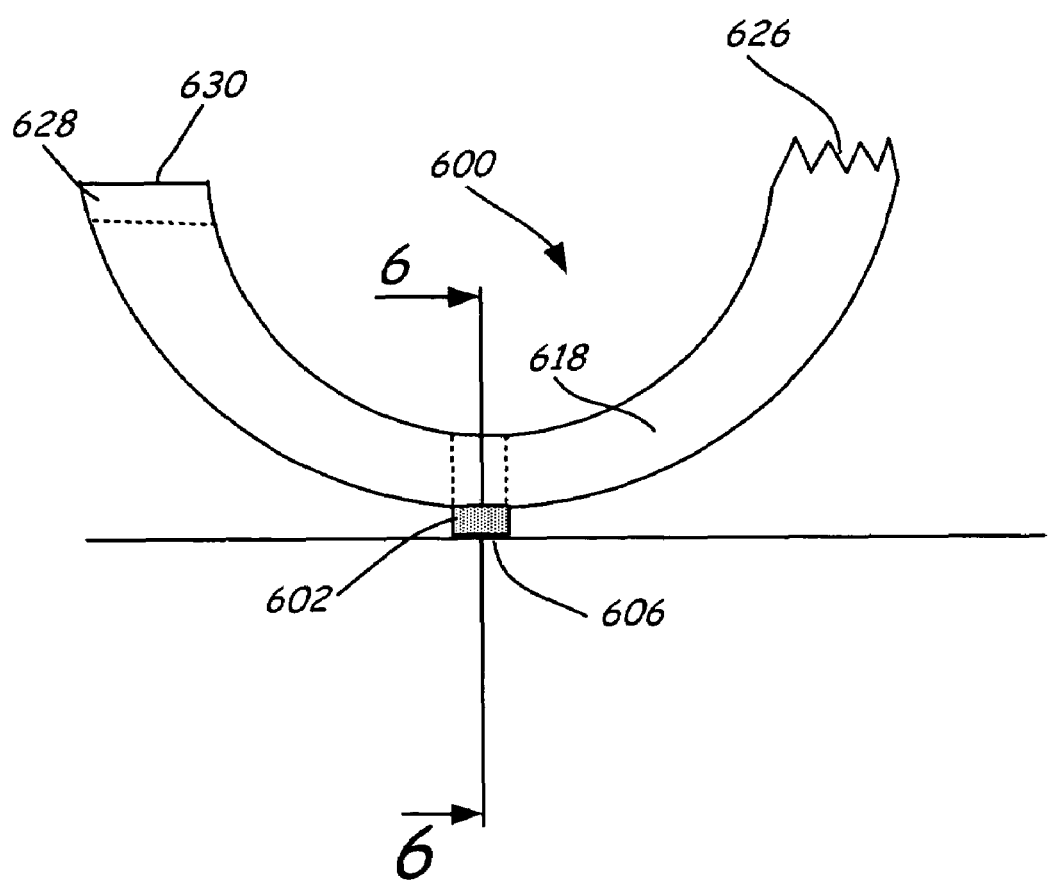
FIG. 7 is a top view of a magnetic writer of FIG. 6.

FIGS. 6 and 7 show a magnetic writer 600 with a clad coil having a single turn around a main pole. FIG. 6 is a cross-sectional view taken through line 6-6 of FIG. 7. The magnetic writer 600 has a main pole 602 and a air bearing surface 606. Surrounding the main pole 602 with one turn is a conductive coil 611 having an upper conductive coil turn 612 and a lower conductive coil turn 613. Upper coil turn 612 and lower coil turn 613 are shown adjacent to the air bearing surface 606 but could be removed from the air bearing surface 606. The conductive coil turns 612, 613 are separated from the main pole 602 by insulation 614.

Upper conductive coil turn 612 is surrounded by a cladding 618 that is in direct contact with upper conductive coil turn 612. Top cladding 621 and side cladding 622 cover three sides of the upper conductive coil turn 612 leaving an open end 624 of the upper conductive coil turn 612 exposed to the main pole 602. Lower conductive coil turn 613 is surrounded by a cladding 618 that is in direct contact with the lower conductive coil turn 613. Lower cladding 620 and side cladding 622 cover three sides of the lower conductive coil turn 613 leaving an open end 624 of the lower conductive coil turn 613 exposed to the main pole 602. Because the cladding 618 has a much higher permeability, the magnetic field 616 generated around the upper conductive coil turn 612 and lower conductive coil turn 613 passes preferentially through the cladding 618. Only where the cladding 618 is not present is the magnetic field 616 allowed to emanate from the conductive coil turn 612, 613. Open end 624 of the conductive coil turn 612, 613 is not covered with the cladding 618, so the magnetic field 616 emanates outward from open end 624 of the conductive coil turns 612, 613 towards the main pole 602.

In this embodiment, there is not a return pole and because the cladding 618 is constructed of a magnetic material, most of the magnetic field 616 is returned to the cladding 618. To prevent erasure problem with the magnetic field 616 returning to the cladding 618, the cladding 618 can be designed so as to saturate during the write process. This will prevent the return magnetic field from going through the cladding. Then, the magnetic field 616 will propagate through a larger volume of non-permeable material around the writer 600. Alternatively, the cladding 618 and conductive coil turns 612, 613 can be recessed from the air bearing surface 606 to minimize erasure caused by the return magnetic field 616.

FIG. 7 is a top view of the writer shown in FIG. 6. As can be seen the writer 600 is a U-shaped device with one end shown shown broken 626 that extends to make the electrical connection to the coil and the other end closed 630. At the closed end 630 the upper and lower conductive coil turns meet at a via 628. The U-shaped device curves at the air bearing surface 606. Extending from the writer 600 at the air bearing surface 606 is the main pole 602. Surrounding the main pole are the clad coils 618.

The embodiment shown in FIGS. 6 and 7 has the advantage that its overall size is reduced, thereby reducing writer volume and improving high data rate performance. The return pole has been eliminated, there is only one turn of the conductive coil 611, and the overall length of the main pole 602 is reduced. All of these features lead to a decreased size of the writer 600.

The conductive coils of the present invention are constructed of a non-magnetic, conductive material having a low resistivity such as copper. The cladding, cladding core, and cladding shield are made of magnetically soft, permeable material. The material may be a magnetically soft alloy or a soft ferromagnetic alloy. Such materials for the cladding may include $Ni_{80}Fe_{20}$, CoZrTa, CoZrNb, CoNiFe, FeAlN, or NiFeCu. The permeable material allows for the magnetic field to pass through the material and extend out only where the permeable material is missing. Further the magnetic field passing through the cladding, cladding core, and cladding shield is added to the magnetic field generated by the current passing through the conductive coil.

In the embodiments described the main pole may be constructed of a single layer of material or may be constructed of a double layer structure. For the double layer structure, one layer may be a soft material that is slightly recessed from the air bearing surface while the other layer at the air bearing surface is a high coercivity material. The double layer material has advantages for high frequency writing that is known in the art.

The cladding, cladding core and cladding shield allow for better direction of the magnetic field generated through the conductive coils by focusing the magnetic field at the main pole and reducing the field at a return pole. This allow for increased focus of the magnetic field at the main pole allowing for a minimum amount of current. This focused magnetic field also allows the return pole to be positioned closer to the main pole.

In other embodiments of the present invention, the cladding or cladding core may be formed on all four sides of the coil turns or less than four sides of the conductive coil turns. It may be desirable to focus the magnetic field on the main pole and the return pole, thus leaving the sides of the conductive coil turns facing the poles free of cladding material. Cladding material may be formed on only one side of the conductive coil turn, preferably the side of the conductive coil turn facing the return pole to minimize magnetic field at the return pole. If there is not a return pole in the design, then the cladding material best directs the magnetic field to the main pole when no cladding is present on the side of the coil facing the main pole.

The cladding, cladding core, or cladding shield can be formed uniformly along the full length of the conductive coil. In other embodiments, the cladding, cladding core, or cladding shield can be formed nonuniformly along the length of the conductive coil. When it is formed nonuniformly, the cladding, cladding core, or cladding shield may be only in the region closely adjacent to the main pole. Additionally, the cladding, cladding core, or cladding shield may be formed in the region located outside of the main pole area, behind the via. In such a situation, the cladding, cladding core or cladding shield may be formed the same or differently than the cladding at the main pole area. In one embodiment, the cladding may be formed on all four sides of the conductive coil in the area outside of the main pole as shown in FIG. 2.

Reducing the magnetic field at the return pole reduces the potential for side erasure. Additionally, because the cladding, cladding core, and cladding shield allows for better direction of the magnetic field, the conductive coils may be placed closer to the air bearing surface to increase writer efficiency without having magnetic field leaking to the medium and interfering with the writing process. In some embodiments, the cladding, cladding core, or cladding shield may be positioned at the air bearing surface, or the cladding, cladding core, or cladding shield may be removed from the air bearing surface.

A cladding, cladding core, and cladding shield can dissipate heat generated from the current through the conductive coils more effectively than insulation alone. Therefore, the present invention can have the effect of reducing localized heating within the write head.

Cladding may be formed in a manner to affect an oriented magnetic anisotropy in order to control the permeability and the domain structure of the cladding. An induced anisotropy helps prevent a magnetic field from interfering with the medium when the writer is not in operation. Therefore, an induced anisotropy helps prevent erasure problems caused by the cladding.

Although FIG. 2-6 depict the cladding as a single layer, the cladding may be a multiple layer structure having an additional bias layer such as an antiferromagnetic exchange layer, which also may control the cladding permeability and domain structure. An antiferromagnetic exchange layer would be placed in contact with the cladding layer.

Cladding anisotropy and magnetization can be controlled in such a manner to effect frequency response of permeability. The cladding may be fabricated of suitable thickness, anisotropy, and magnetization to either saturate or to not saturate during operation. Further, cladding can be used to improve high data performance by reducing inductance.

As is apparent from the disclosure of the invention, any design of coils such as flat or helical may be used to carry out the present invention. Additionally, although the present invention is primarily directed at perpendicular recording, the design may also apply to longitudinal recording as well.

In constructing the clad coils for a write head of the present invention as shown in FIG. 2, on top of the return pole and a layer of insulation, a seed layer of a magnetic material is deposited that will form the bottom clad 220. On the magnetic seed layer, conductive coil 211 is plated. The cladding 218 is deposited as a magnetic film over the entire surface. The magnetic film and magnetic seed layer is milled from the area between the conductive coil 211 leaving magnetic film to form the side cladding 222 and bottom cladding 220. The top surface of the conductive coil 211 is planarized removing the top layer of the magnetic film and exposing open end 224. Insulation is filled in to cover the conductive coil 211, and then through chemical mechanical polishing the insulation is planarized to a flat surface. A layer of alumina insulation is covered on the insulation, and then the main pole 202 is deposited. A similar process with variations to conform to the particular aspects of each embodiment can be used to construct the write heads of the various embodiments of the present invention.

Although the present invention has been described with reference to preferred embodiments, workers skilled in the art will recognize that changes may be made in form and detail without departing from the spirit and scope of the invention.

What is claimed is:

1. A magnetic write head comprising:
a main pole for writing data to a magnetic medium;
a conductive coil positioned adjacent the main pole, the conductive coil being insulated from the main pole and producing a magnetic field in response to a write current flowing through the conductive coil; and
means for directing the magnetic field produced by the conductive coil toward the main pole and minimizing the magnetic field in directions other than toward the main pole;
a return pole, wherein at least a portion of the conductive coil is positioned between the main pole and the return pole; and
a magnetic shield positioned between the main pole and the return pole.

2. The magnetic write head of claim 1, wherein the conductive coil has a top side, a bottom side, a first side, and a second side, and wherein the means for directing the magnetic field comprises a ferromagnetic cladding on at least the bottom side of the conductive coil adjacent the return pole.

3. The magnetic write head of claim 1, wherein the conductive coil has a top side, a bottom side, a first side, and a second side, and wherein the means for directing the magnetic field comprises a cladding covering the bottom side, the first side, and the second side of the conductive coil.

4. The magnetic write head of claim 3, wherein the cladding is a magnetically soft alloy.

5. The magnetic write head of claim 4, wherein the magnetically soft alloy is selected from the group consisting of $Ni_{80}Fe_{20}$, CoZrTa, CoZrNb, CoNiFe, FeAlN, and NiFeCu.

6. The magnetic write head of claim 3, wherein the cladding has an induced anisotropy.

7. A magnetic write head comprising:
a main pole for writing data to a magnetic medium;
a return pole for writing data to a magnetic medium;
a conductive coil having a top side, a bottom side, a first side, and a second side, wherein at least a portion of the conductive coil is positioned between the main pole and the return pole, the conductive coil being insulated from the main pole, the conductive coil producing a magnetic field in response to a write current flowing through the conductive coil;
a ferromagnetic cladding adjacent to at least one of the top side, bottom side, first side, and second side of the conductive coil to direct the magnetic field produced by the conductive coil toward the main pole and away from the return pole; and
a magnetic shield positioned between the main pole and the return pole.

8. The magnetic write head of claim 7, wherein the ferromagnetic cladding has an induced anisotropy.

9. The magnetic write head of claim 7, wherein the ferromagnetic cladding is in direct contact with the conductive coil.

10. The magnetic write head of claim 7, wherein the ferromagnetic cladding is a magnetically soft alloy.

11. The magnetic write head of claim 10, wherein the magnetically soft alloy is selected from the group consisting of $Ni_{80}Fe_{20}$, CoZrTa, CoZrNb, CoNiFe, FeAlN, and NiFeCu.

12. The magnetic write head of claim 7, wherein the ferromagnetic cladding is adjacent to at least two sides of the conductive coil.

13. The magnetic write head of claim 7, wherein the ferromagnetic cladding is adjacent to at least three sides of the conductive coil.

14. A magnetic write head comprising:
a first pole for writing data to a magnetic medium;
a second pole spaced apart from the first pole; and a clad coil having a portion positioned between the first pole and the second pole, the clad coil comprising a ferromagnetic material adjacent to at least a portion of a non-magnetic electrical conductor to direct a magnetic field produced by a current flow through the conductor toward the first pole and away from the second pole; wherein the non-magnetic electrical conductor has a top side, a bottom side, a first side, and a second side, and wherein the ferromagnetic material is a cladding core insulated from and adjacent to the bottom side, first side, and second side of the non-magnetic electrical conductor, wherein the top side of the non-magnetic electrical conductor is exposed to the first pole.

15. The magnetic write head of claim 14, wherein the ferromagnetic material has an induced anisotropy.

16. The magnetic write head of claim 14, wherein the ferromagnetic material is a magnetically soft alloy.

17. The magnetic write head of claim 16, wherein the magnetically soft alloy is selected from the group consisting of $Ni_{80}Fe_{20}$, CoZrTa, CoZrNb, CoNiFe, FeAlN, and NiFeCu.

18. The magnetic write head of claim 14, wherein the non-magnetic electrical conductor has a top side, a bottom side, a first side, and a second side, and wherein the ferromagnetic material is adjacent to at least two sides of the non-magnetic electrically conductive material exposing the top side of the non-magnetic electrical conductor to the first pole.

19. The magnetic write head of claim 14, wherein the non-magnetic electrical conductor has a top side, a bottom side, a first side, and a second side, and wherein the ferromagnetic material is adjacent to the bottom side, first side, and second side of the non-magnetic electrical conductor exposing the top side of the non-magnetic electrical conductor to the first pole.

20. The magnetic write head of claim 14, wherein the clad coil is positioned adjacent an air bearing surface.

21. The magnetic write head of claim 14, wherein the clad coil is removed from the air bearing surface.

22. The magnetic write head of claim 14, wherein the ferromagnetic material saturates when a writing current is supplied through the clad coil.

23. The magnetic write head of claim 14, wherein the ferromagnetic material does not saturate when a writing current is supplied through the clad coil.

24. The magnetic write head of claim 14, further comprising:
a bias layer positioned adjacent the ferromagnetic material.

25. The magnetic write head of claim 24, wherein the bias layer is an antiferromagnetic exchange layer.

26. A magnetic write head comprising:
a return pole;
a conductive coil having a top side, a bottom side, a first side, and a second side, wherein the conductive coil is insulated from the main pole; and
a ferromagnetic cladding core adjacent to at least one of the top side, bottom side, first side, and second side of the conductive coil, wherein the ferromagnetic cladding is insulated from and adjacent to the conductive coil, wherein the top side of the conductive coil is exposed to the main pole.

27. The magnetic write head of claim 26, further comprising:
a return pole, wherein at least a portion of the conductive coil is positioned between the main pole and the return pole.

28. The magnetic write head of claim 26, wherein the ferromagnetic cladding is adjacent to at least three sides of the conductive coil.

29. A magnetic write head comprising:
a first pole for writing data to a magnetic medium;
a second pole spaced apart from the first pole;
a via connecting the first pole and the second pole; and
a clad coil having a portion positioned between the first pole and the second pole, the clad coil comprising a ferromagnetic material adjacent to at least a portion of a non-magnetic electrical conductor to direct a magnetic field produced by a current flow through the conductor toward the first pole and away from the second pole, wherein:
the non-magnetic electrical conductor has a top side, a bottom side, a first side, and a second side;
the clad coil includes a cladding of the ferromagnetic material on at least the bottom side of the non-magnetic electrical conductor facing the second pole; and
the clad coil circles around the via and includes a cladding of the ferromagnetic material adjacent at least one side of the non-magnetic electrical conductor of a portion of the clad coil that is not positioned between the first and second poles.

30. The magnetic write head of claim 29, wherein the at least one surface of the non-magnetic electrical conductor of a portion of the clad coil that is not positioned between the first and second poles is a surface facing away from the first pole.

31. The magnetic write head of claim 29, wherein the portion of the clad coil that is not positioned between the first and second poles includes cladding on all sides.

32. A magnetic write head comprising:
a main pole;
a conductive coil forming at least one loop around the main pole and having a first surface that faces the main pole; and
a magnetic cladding adjacent to at least a second side of the conductive coil that does not face the main pole.

33. The magnetic head of claim 32, wherein the magnetic cladding covers all surfaces of the conductive coil other than the first surface.

34. The magnetic head of claim 32, wherein the conductive coil forms multiple loops around the main pole.

35. The magnetic head of claim 32, and further comprising:
a return pole spaced from the main pole and outside the at least one loop of the conductive coil.

* * * * *